US008756420B2

(12) United States Patent
Chang et al.

(10) Patent No.: US 8,756,420 B2
(45) Date of Patent: Jun. 17, 2014

(54) SYSTEM AND METHOD FOR ENCRYPTING AND STORING DATA

(75) Inventors: Chih-Kuang Chang, New Taipei (TW);
Zhong-Kui Yuan, Shenzhen (CN); Li Jiang, Shenzhen (CN); Dong-Hai Li, Shenzhen (CN); Xiao-Guang Xue, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 51 days.

(21) Appl. No.: 13/598,794

(22) Filed: Aug. 30, 2012

(65) Prior Publication Data
US 2013/0138974 A1    May 30, 2013

(30) Foreign Application Priority Data
Nov. 28, 2011    (CN) .......................... 2011 1 0383853

(51) Int. Cl.
*H04L 29/06*    (2006.01)
(52) U.S. Cl.
USPC ............................ 713/167; 713/164; 713/165
(58) Field of Classification Search
CPC ............................ H04L 9/0863; H04L 63/067
USPC ......................................... 713/164, 165, 167
See application file for complete search history.

(56) References Cited

U.S. PATENT DOCUMENTS

| 7,571,489 | B2* | 8/2009 | Ong et al. ................. 726/29 |
| 8,160,243 | B1* | 4/2012 | Bean ......................... 380/28 |
| 2003/0026431 | A1* | 2/2003 | Hammersmith .......... 380/277 |
| 2006/0182283 | A1* | 8/2006 | Sandhu et al. ............ 380/286 |
| 2006/0236111 | A1* | 10/2006 | Bodensjo et al. .......... 713/176 |
| 2007/0157298 | A1* | 7/2007 | Dingwall et al. ........... 726/8 |
| 2008/0010453 | A1* | 1/2008 | Hamid ...................... 713/159 |
| 2008/0172713 | A1* | 7/2008 | Kamendje et al. .......... 726/1 |
| 2008/0208758 | A1* | 8/2008 | Spiker et al. .............. 705/70 |
| 2010/0250968 | A1* | 9/2010 | Sadler ....................... 713/193 |
| 2010/0274726 | A1* | 10/2010 | Florek et al. .............. 705/72 |
| 2011/0051928 | A1* | 3/2011 | Ari ............................ 380/28 |

OTHER PUBLICATIONS

Cheng, Fred; A Novel Rubbing Encryption Algorithm and the Implementation of a Web Based One-time Password Token, 2010, IEEE 34th Annual Computer Software and Applications Conference IEEE, pp. 147-154.*
Cheng et al.; "The Dynamic and Double Encryption System Based on Two-dimensional Image," 2009, 2009 International Conference on Computational Intelligence and Security, IEEE, pp. 458-462.*

* cited by examiner

*Primary Examiner* — Luu Pham
*Assistant Examiner* — Roderick Tolentino
(74) *Attorney, Agent, or Firm* — Novak Druce Connolly Bove + Quigg LLP

(57) ABSTRACT

A computing device connects with a vision measuring machine (VMS). Then the computing device generates a one time password (OTP). A size of the OTP, the OTP are stored in a predefined file. The computing device obtains a size of measurement program codes of the VMS. The size of the OTP and the size of the measurement program codes are stored in the predefined file. The measurement program codes are encrypted by the OTP. If the measurement data includes image data of an object which is measured by the VMS, the computing device stores the encrypted program codes, a type of the image data, image data, and a size of the image data in the predefined file.

9 Claims, 4 Drawing Sheets

SYSTEM AND METHOD FOR ENCRYPTING AND STORING DATA

BACKGROUND

1. Technical Field

Embodiments of the present disclosure relate to data management systems and methods, and particularly to a system and a method for encrypting and storing data.

2. Description of Related Art

A vision measuring machine (VMS) scans surface of objects to obtain images and image data of the objects. The images of each object are stored as an image file. Measurement program codes of the VMS and the image data of each object are stored as a text file. Too many image files and the test files may be prone to mistakes. In addition, an unauthorized person can easily modify the program codes and image data.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
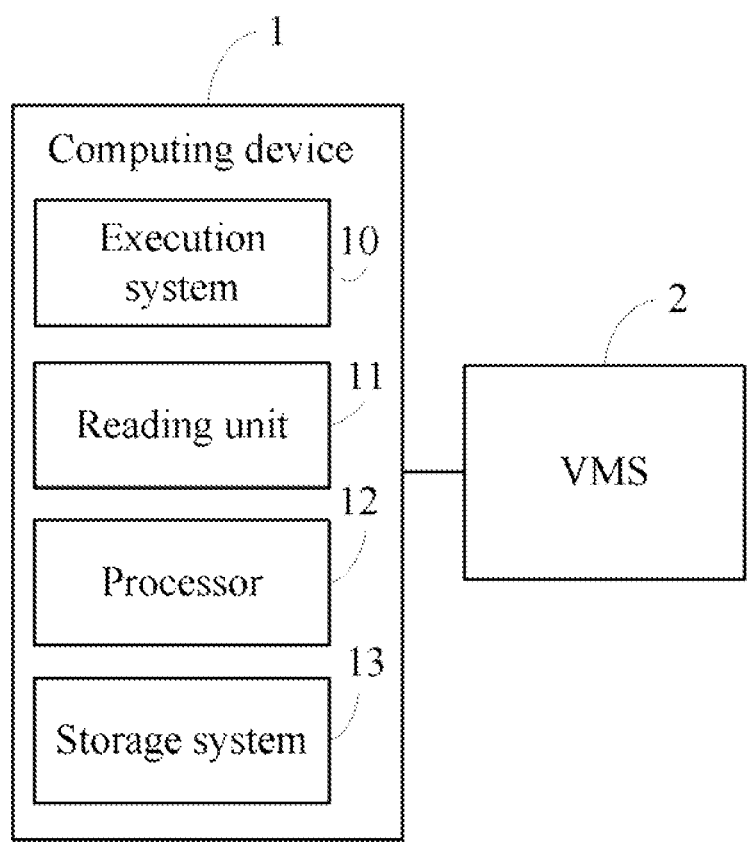
FIG. 1 is a block diagram of one embodiment of a computing device comprising an execution system.

FIG. 1 is a block diagram of one embodiment of a computing device 1 including an execution system 10 and a reading unit 11. The computing device 1 is electronically connected to a vision measuring machine (VMS) 2. The VMS 2 scans objects and obtains images of the objects. The execution system 10 stores measurement data of the VMS 2 in a predefined file in a predefined order. The reading unit 11 reads the predefined file to obtain the measurement data in the predefined order.

In an exemplary embodiment, the computing device 1 includes at least one processor 12 and a storage system 13. The execution system 10 may include one or more modules (also described in FIG. 2). The one or more modules may comprise computerized codes in the form of one or more programs that are stored in the storage system 13. In one embodiment, the storage system 13 may be a magnetic storage system, an optical storage system, or other suitable storage medium. The computerized codes includes instructions that are executed by the at least one processor 12 to provide functions for the one or more modules described below. The storage system 13 stores measurement data of the VMS 2. The measurement data are binary data. In one embodiment, the measurement data of the VMS 2 may include measurement program codes, a version number of the measurement program codes, and image data of the objects. In one embodiment, the image data may include template images, reference images of the objects, and types of the image data. The types of the image data may include an image type and a text type, for example.

Figure 2:
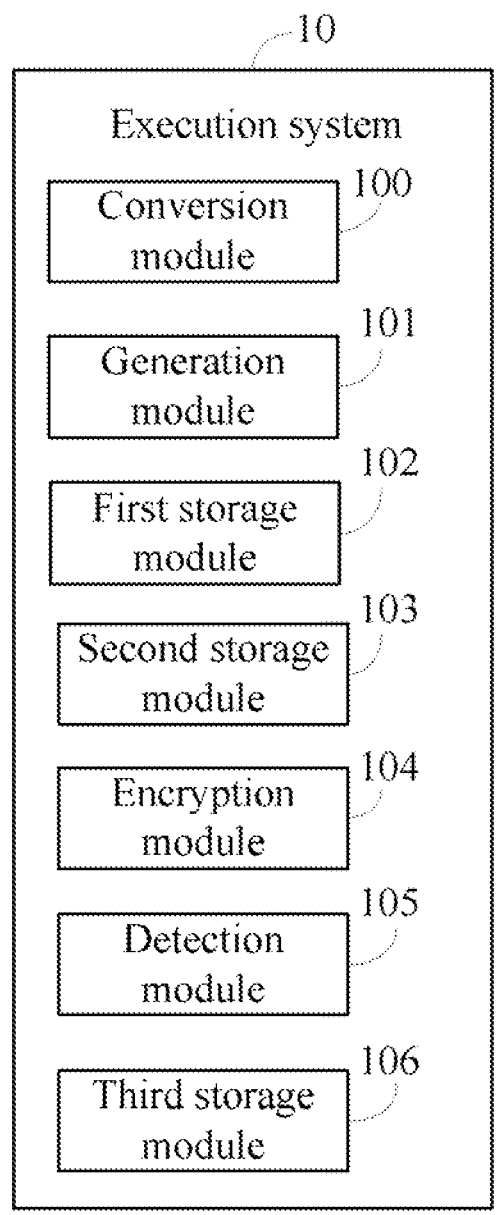
FIG. 2 is a block diagram of one embodiment of the function modules of the execution system in FIG. 1.

As shown in FIG. 2, the execution system 10 includes a conversion module 100, a generation module 101, a first storage module 102, a second storage module 103, an encryption module 104, a detection module 105, and a third storage module 106.

The conversion module 100 calculates a size of binary data of each measurement data in the storage system 13. The size of the binary data is the total number of digital bits of the binary data. For example, if an item of binary data is "01010101", the size of the binary data is eight bits.

The generation module 101 generates a one time password (OTP), The first storage module 102 stores the OTP and the size of the OTP in the predefined file.

Figure 4:
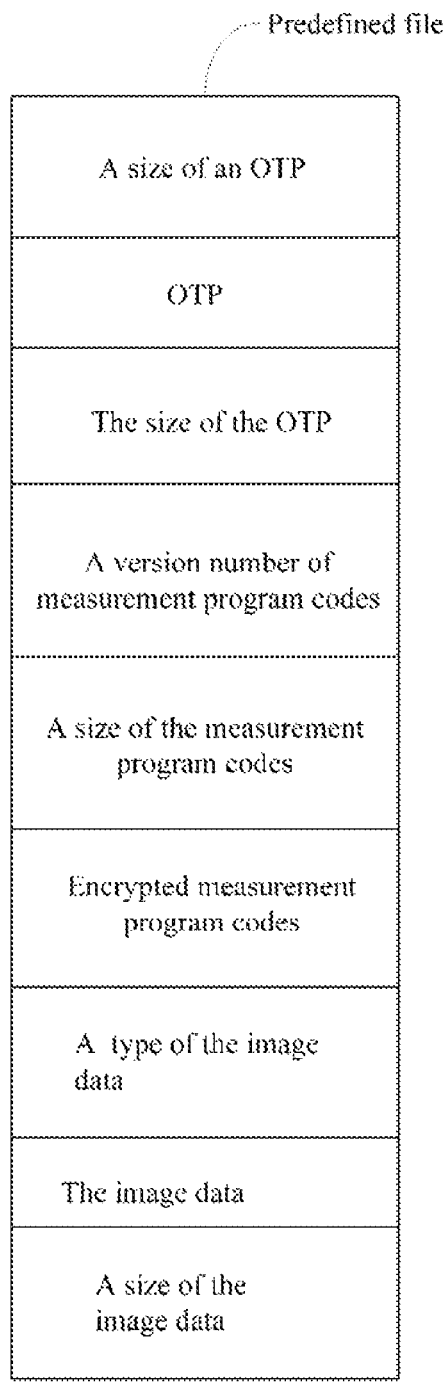
FIG. 4 shows one embodiment of a predefined file.

The second storage module 103 obtains a size of the measurement program codes from the calculated size of the measurement data. The second storage module 103 stores the size of the OTP, the version number of the measurement program codes after the OTP in the predefined file. The second storage module 103 stores the size of the measurement program codes again in the predefined file. The size of the OTP is stored twice to make sure that the OTP cannot be changed by unauthorized persons. As shown in FIG. 4, the size of the OTP is stored in the front of the predefined file by the first storage module 102. The second storage module 103 stores the size of the OTP after the OTP in the predefined file. If the predefined file is amended by an unauthorized person, the size of the OTP in the front of the predefined file is changed. If the reading unit 11 reads the predefined file, the size of the OTP in the front of the predefined file is different from the size of the OTP which is stored after the OTP in the predefined file. Then the predefined file cannot be read by the reading unit 11 of the computing device 1.

The encryption module 104 encrypts the measurement program codes using the OTP, and stores the encrypted measurement program codes in the predefined file.

The detection module 105 detects if the measurement data includes image data of the object which is measured by the VMS 2.

The third storage module 106 stores the type of the image data, the image data, and the size of the image data in the predefined file if the measurement data includes image data of the object. If the measurement data does not include the image data of the object, the third storage module 106 stores the predefined file in a predefined storage path of the computing device 1. In one embodiment, a file suffix of the predefined file is "*.fvp".

Figure 3:
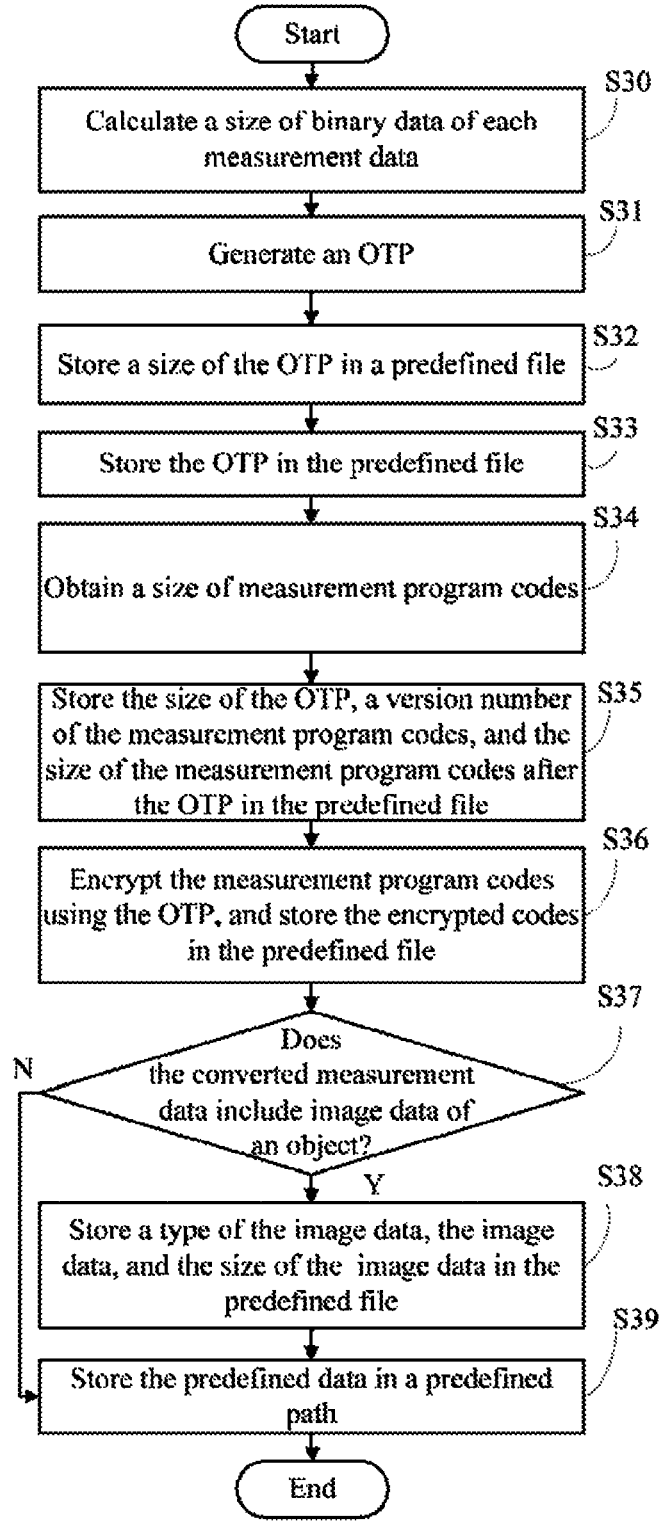
FIG. 3 is a flowchart illustrating one embodiment of a method for encrypting and storing data.

FIG. 3 is a flowchart illustrating a method for encrypting and storing data. Depending on the embodiment, additional steps may be added, others removed, and the ordering of the steps may be changed.

In step S30, the conversion module 100 calculates a size of binary data of each measurement data in the storage system 13.

In step S31, the generation module 101 generates a one time password (OTP).

In step S32, the first storage module 102 stores a size of the OTP in a predefined file.

In step S33, the first storage module 102 stores the OTP in the predefined file. The OTP is stored after the size of the OTP, as shown in FIG. 4.

In step S34, the second storage module 103 obtains a size of the measurement program codes from the calculated size of the measurement data.

In step S35, the second storage module 103 stores the size of the OTP, the version number of the measurement program codes, and the size of the measurement program codes after the OTP in the predefined file.

In step S36, the encryption module 104 encrypts the measurement program codes by using the OTP, and stores the encrypted measurement program codes in the predefined file.

In step S37, the detection module 105 detects if the measurement data includes image data of the object which is measured by the VMS 2. If the measurement data includes the image data of the object, block S38 is implemented. If the measurement data does not include the image data of the object, block S39 is implemented.

In step S38, the third storage module 106 stores the type of the image data, the image data, and the size of the image data in the predefined file.

In step S39, the third storage module 106 stores the predefined file in a predefined storage path of the computing device 1. In one embodiment, a file suffix of the predefined file is "*.fvp".

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing device, comprising:
a storage system;
at least one processor;
and one or more programs being stored in the storage system and executable by the at least one processor, the one or more programs comprising:
a conversion circuit that calculates sizes of binary data of measurement program codes and a version number of the measurement program codes;
a generation circuit that generates a one time password, wherein the conversion circuit calculates a size of the one time password (OTP);
a first storage circuit that stores a size of the one time password and the one time password in a predefined file;
a second storage circuit that stores the size of the one time password again in the predefined file, and stores the version number, the size of the measurement program codes in the predefined file;
a reading circuit that determines if the size of the OTP has been changed by comparing the size of the one time password stored by the first storage circuit with the size of the one time password stored by the second storage circuit;
and in response to the comparison:
an encryption circuit that encrypts the measurement program codes using the one time password, and stores the encrypted measurement program codes in the predefined file;
and a third storage circuit that stores the predefined file in a predefined storage path of the computing device.

2. The computing device as described in claim 1, wherein the binary data of measurement program codes and the version number of the measurement program codes is image data of an object, wherein the object is measured by a vision measuring machine (VMS) connected to the computing device.

3. The computing device as described in claim 2, wherein the third storage circuit further stores a type of the image data of the object, the size of the image data of the object, and the image data of the object in the predefined file.

4. A computer-based method for encrypting and storing data, comprising:
calculating sizes of binary data of measurement program codes and a version number of the measurement program codes;
generating, by a computing device, a one time password (OTP);
calculating a size of the one time password;
storing, by a first storage circuit, a size of the one time password and the one time password in a predefined file;
storing, by a second storage circuit, the size of the one time password again in the predefined file, and storing the version number, the size of the measurement program codes in the predefined file;
reading if the size of the OTP has been changed by comparing the size of the one time password stored by the first storage circuit with the size of the one time password stored by the second storage circuit;
and in response to the comparison:
encrypting the measurement program codes using the one time password, and storing the encrypted measurement program codes in the predefined file;
and storing the predefined file in a predefined storage path of the computing device.

5. The method as described in claim 4, wherein the binary data of measurement program codes and the version number of the measurement program codes is image data of an object, wherein the object is measured by a vision measuring machine (VMS) connected to the computing device.

6. The method as described in claim 5, wherein the method further comprises: storing a type of the image data of the object, the size of the image data of the object, and the image data of the object in the predefined file.

7. A non-transitory storage medium having stored thereon instructions that, when executed by a processor, cause the processor to perform a method for encrypting and storing data, the method comprising:
calculating sizes of binary data of measurement program codes and a version number of the measurement program codes;
generating a one time password (OTP);
calculating a size of the one time password;
storing, by a first storage circuit, a size of the one time password and the one time password in a predefined file;
storing, by a second storage circuit, the size of the one time password again in the predefined file, and storing the version number, the size of the measurement program codes in the predefined file;
reading if the size of the OTP has been changed by comparing the size of the one time password stored by the first storage circuit with the size of the one time password stored by the second storage circuit;
and in response to the comparison:
encrypting the measurement program codes using the one time password, and storing the encrypted measurement program codes in the predefined file; and storing the predefined file in a predefined storage path of the computing device.

8. The non-transitory storage medium as described in claim 7, wherein the binary data of measurement program codes and the version number of the measurement program codes is calculating a size of image data of an object, wherein the object is measured by a vision measuring machine (VMS) connected to the computing device.

9. The non-transitory storage medium as described in claim 8, wherein the method further comprise: storing a type of the image data of the object, the size of the image data of the object, and the image data of the object in the predefined file.

* * * * *